United States Patent [19]

Byrd et al.

[11] Patent Number: 4,877,985
[45] Date of Patent: Oct. 31, 1989

[54] DYNAMOELECTRIC MACHINE

[76] Inventors: William A. Byrd, 1107 Brookfield, Rockford, Ill. 61107; Joel E. Oman, 4450 River La., Rockford, Ill. 61111; William Connors, 6830 Millbrook Dr., Rockford, Ill. 61108

[21] Appl. No.: 946,719
[22] Filed: Dec. 29, 1986
[51] Int. Cl.[4] .............................................. H02K 5/10
[52] U.S. Cl. ......................................... 310/86; 310/42; 310/52; 290/52
[58] Field of Search .................. 310/42, 52, 43, 64, 310/85, 54, 86, 87, 112, 254, 113, 261; 190/52

[56] References Cited

U.S. PATENT DOCUMENTS

| | | | |
|---|---|---|---|
| 1,543,502 | 6/1925 | Hobart | 310/54 UX |
| 2,919,359 | 12/1959 | Luenberger | 310/86 |
| 3,192,861 | 7/1965 | Haegh | 310/86 |
| 3,366,813 | 1/1968 | Madsen | 310/262 |
| 3,609,420 | 9/1971 | Isagaki et al. | 310/54 |
| 3,663,848 | 5/1972 | Lehoczky | 310/90 |
| 3,688,137 | 8/1972 | Filhol | 310/43 |
| 3,867,658 | 2/1975 | Dochterman | 310/71 |
| 4,153,868 | 5/1979 | Janotik | 322/219 |
| 4,227,108 | 10/1980 | Washizu et al. | 310/214 |
| 4,394,582 | 7/1983 | Kreissl | 290/52 |
| 4,492,889 | 1/1985 | Fukushi et al. | 310/87 |
| 4,558,228 | 12/1985 | Larjola | 290/52 |

FOREIGN PATENT DOCUMENTS 0095124  5/1985  Japan ............................ 290/52

Primary Examiner—R. Skudy

[57] ABSTRACT

In order to isolate a corrosive or reactive fluid in the interior of a dynamoelectric machine from contact with the stator assembly, while avoiding leakage or loss of the working fluid and avoiding contamination of the immediate surroundings and the working fluid in a closed cycle system, and ensuring maintenance-free operation for extended periods of time, the dynamoelectric machine includes a composite shielding member disposed between the stator and the rotor. The composite shielding member is formed of a non-conductive non-magnetic material at least in the region defined by the core of the stator and extending beyond the core at both ends thereof at least into the region defined by the winding of the stator. With this arrangement, the composite shielding member is formed of a non-porous ceramic material facing the rotor to prevent fluid migration therethrough and is also formed of a second material integral with the ceramic material for securing the composite shielding member in a fixed position to define a rotor cavity adapted to receive a fluid therewithin in a manner in which the core of the stator is isolated from the fluid in the rotor cavity.

26 Claims, 2 Drawing Sheets

DYNAMOELECTRIC MACHINE

FIELD OF THE INVENTION

The present invention relates to dynamoelectric machines of the type having a rotor and a stator and, more particularly, to shielding members for separating the rotor from the stator in a dynamoelectric machine housing.

BACKGROUND OF THE INVENTION

In various applications, corrosive or reactive fluids are allowed to invade the interior of a dynamoelectric machine. Such corrosive or reactive fluids may be used for lubrication, cooling and/or driving a turbine for purposes of turning an alternator to supply electrical power. One problem encountered in such applications is related to the necessity of isolating the stator assembly from the corrosive or reactive fluid.

In one particular application, a dynamoelectric machine has been proposed to serve as a power supply for the Space Station. It is contemplated that, in such an application, a corrosive or reactive fluid such as toluene is heated indirectly by means of solar energy and passes through nozzles in gaseous form to cause a turbine to spin thus turning the alternator to supply electrical power in what must necessarily be a closed cycle system. In such a closed cycle system, it is important to avoid loss of system working fluid and to avoid contamination of the immediate surroundings.

Because of such requirements, the working fluid portion of the dynamoelectric machine must remain sealed. Also, due to the particular requirements of the Space Station, the dynamoelectric machine should be capable of maintenance-free operation for extended periods of time, e.g., on the order of 10 to 30 years. However, when toluene is utilized as the working fluid, insulating materials can be softened and seriously degraded by the toluene. Likewise, toluene can be contaminated by outgassing from the insulating materials.

Because of the corrosive or reactive nature of toluene, a shielding member is advantageously disposed between the rotor and the stator. Such a shielding member, which may suitably define a rotor cavity separated from the stator, must be non-magnetic, non-conductive, non-porous and non-outgassing. In addition, the shielding member must be capable of handling corrosive or reactive fluids at operating temperatures on the order of 250-400° F.

In the past, dynamoelectric machines containing shielding members have typically isolated the working fluid from the windings particularly where the working fluid was oil or liquid metal. However, shielding members in such machines would not work with corrosive or reactive fluids such as toluene, Freon, ammonia, and other organic fluids that are normally considered to be solvents since the resinous insulating materials conventionally employed in such shielding members would degrade in such working fluids and the shielding member would not prevent outgassing with the working fluid. Accordingly, it has remained to provide a shielding member in a dynamoelectric machine that is capable of utilization with corrosive or reactive fluids.

Among the early attempts to provide a shielding layer is that disclosed in Washizu et al U.S. Pat. No. 4,227,108 which is formed by an aggregate-containing glass compound on an inner surface of the center bore of an annular laminated stator core. Also, Dochterman U.S. Pat. No. 3,867,658 discloses barrier means in the form of a sleeve made from ceramic material and Janotik U.S. Pat. No. 4,153,868 discloses the utilization of a non-conductive ceramic material to cover the surface area defining a stator opening. Moreover, Hobart U.S. Pat. No. 1,543,502 discloses a three-piece partition formed of end flanges with the center portion comprising a non-magnetic material and Madsen U.S. Pat. No. 3,366,813 discloses a glass fiber reinforced hollow cylinder in which metal end pieces may be used.

The present invention is directed to overcoming the above-stated problems, advancing the state-of-the-art, and accomplishing the stated objects.

SUMMARY OF THE INVENTION

An exemplary embodiment of the invention achieves the foregoing in a dynamoelectric machine having a stator including a core with a winding applied thereto and having a rotor disposed inwardly of the stator in spaced relation to the core and the winding within a housing. The dynamoelectric machine also includes a composite shielding member disposed within the housing between the stator and the core. With this arrangement, the composite shielding member is formed of a non-conductive non-magnetic material at least in the region defined by the core of the stator and extending beyond the core at both ends thereof at least into the region defined by the winding of the stator.

More specifically, the composite shielding member is formed of a non-porous ceramic material facing the rotor to prevent fluid migration therethrough and is also formed of a second material integral with the ceramic material to serve as a securing and sealing means. In other words, the second material is adapted for securing the composite shielding member in a fixed position within the housing in a sealed manner to define a sealed rotor cavity adapted to receive a fluid therewithin in a manner in which the core of the stator is isolated from the fluid in the rotor cavity. In addition, the dynamoelectric machine includes means for accommodating the fluid in the rotor cavity at a point inwardly of the composite shielding member.

In the preferred embodiment, the core of the stator is laminated and is disposed centrally of the winding. Also, the non-conductive ceramic material is preferably disposed intermediate the end portions of the composite shielding member which end portions are formed of a metallic material comprising the second material integral with the non-conductive non-magnetic ceramic material. With this arrangement, the metallic end portions of the composite shielding member are readily secured directly in a sealed manner to the dynamoelectric machine housing.

In an alternative embodiment, the second material of the composite shielding member is a non-conductive base material. The non-conductive base material i preferably secured directly to the stator. Further, the non-conductive ceramic material is then secured directly to the non-conductive base material.

Where the composite shielding member is formed with metallic end portions, the metallic end portions are preferably formed on the non-conductive ceramic material by one of several methods. First, they can be formed on the non-conductive ceramic material by vapor deposition. Second, they can be pre-formed and secured to the non-conductive ceramic material by thermal or flame attachment. Third, they can be preformed and secured to the non-conductive ceramic material by vapor deposition. Regardless of the method of forming the metallic end portions, the composite shielding member is well suited for utilization with a corrosive reactive fluid such as toluene, Freon, ammonia, or other organic fluids that are considered to be a solvent.

In other words, the fluid is an organic liquid at standard conditions having solvent characteristics. The organic liquid is advantageously in a gaseous state after leakage into the rotor cavity from the high pressure side of a pump or the high pressure side of a turbine which drives the rotor. Preferably, the organic liquid is normally alternately vaporized and condensed in a continuous closed Rankine cycle system.

In the alternative embodiment, the non-conductive base material of the composite shielding member is an epoxy-based material directly secured to the stator. This epoxy-based material can preferably be either a glass-epoxy mixture or a carbon-epoxy mixture. In either case, the non-conductive ceramic material is preferably applied by plasma spraying so as to be directly secured to the epoxy-based material.

In addition, the present invention is directed to a method of forming a composite shielding member in a dynamoelectric machine. The method includes the steps of providing a non-conductive base material, securing the non-conductive base material directly to a stator in a fixed position within a housing to define a sealed rotor cavity adapted to receive a fluid within the dynamoelectric machine, providing a non-conductive non-magnetic ceramic material, and securing the ceramic material directly to the non-conductive base material so as to render the non-conductive ceramic material integral with the non-conductive base material. Further, the non-conductive non-magnetic ceramic material is secured to the non-conductive base material so as to face the rotor cavity to prevent fluid outgassing therethrough.

Finally, the present invention contemplates an alternative method of providing a composite shielding member for a dynamoelectric machine. The alternative method includes the step of providing a hollow non-conductive non-magnetic ceramic portion of a length adapted to be positioned within a housing between a stator and a rotor so as to be positioned at least in the region defined by a core of the stator and extend beyond the core at both ends thereof at least into the region defined by a winding of the stator. The alternative method also includes the step of forming hollow metallic end portions integrally with the hollow non-conductive ceramic portion and of a length adapted for securing the composite shielding member in a fixed position within the housing in a sealed manner to define a sealed rotor cavity adapted to receive a fluid and with the hollow non-conductive ceramic portion facing the rotor cavity to prevent fluid outgassing therethrough. Moreover, the alternative method includes the step of securing the composite shielding member within the housing by securing the hollow metallic end portions to the housing.

Other objects, advantages and features of the present invention will become apparent from the following specification taken in conjunction with the accompanying drawings.

DETAILED DESCRIPTION OF THE PREFERRED EMBODIMENTS

Figure 1:
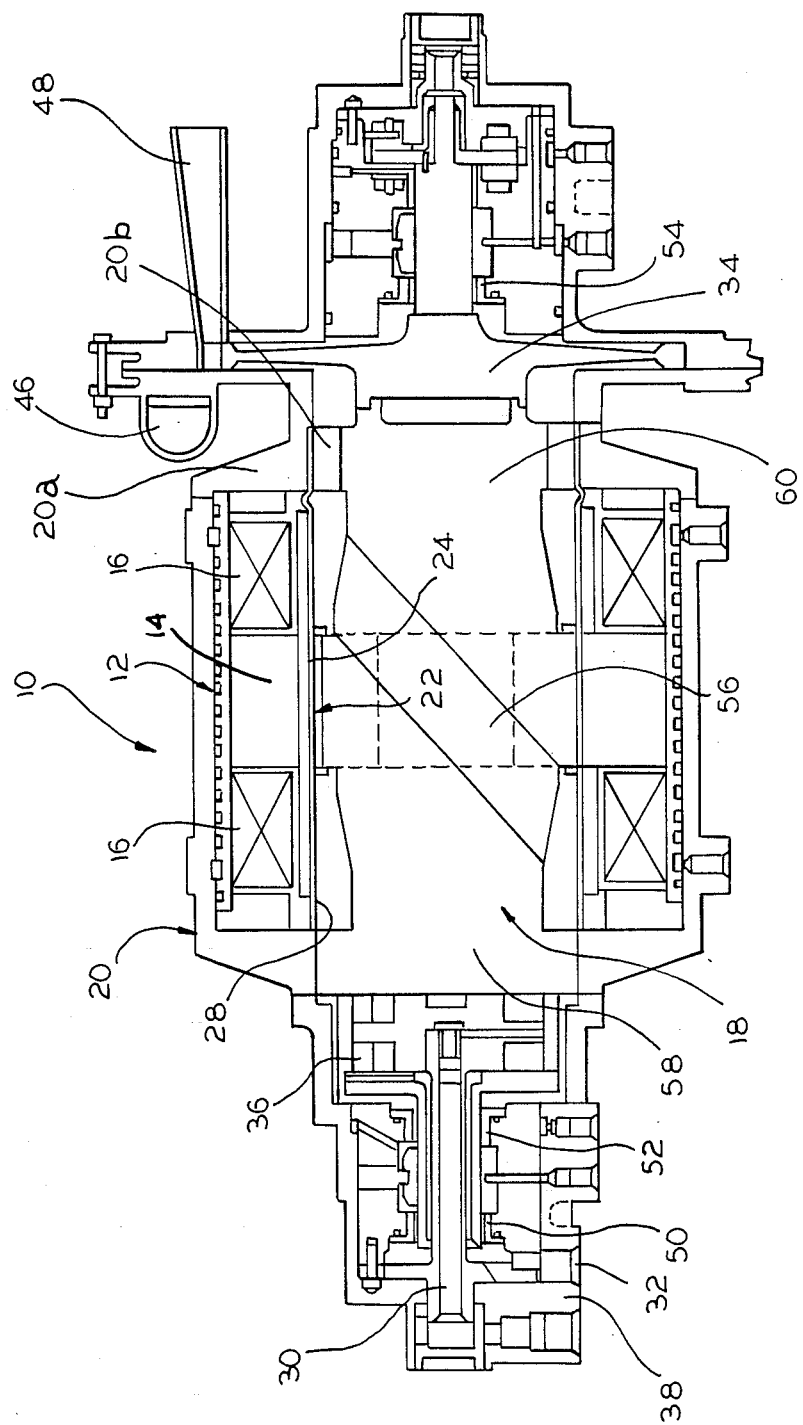
FIG. 1 is a cross-sectional view of a dynamoelectric machine in accordance with the present invention.

Referring to the drawings, and first to FIG. 1, the reference numeral 10 designates generally a dynamoelectric machine in accordance with the present invention. It will be seen that the dynamoelectric machine 10 includes a stator 12 having a core 14 to which a winding 16 is applied, and the machine 10 also includes a rotor, generally designated 18, which is disposed inwardly of the stator 12 in spaced relation to the core 14 and the winding 16. Also, as shown in FIG. 1, the dynamoelectric machine 10 is constructed with the stator 12 and the rotor 18 mounted in a housing 20, all of which is conventional.

Figure 2:
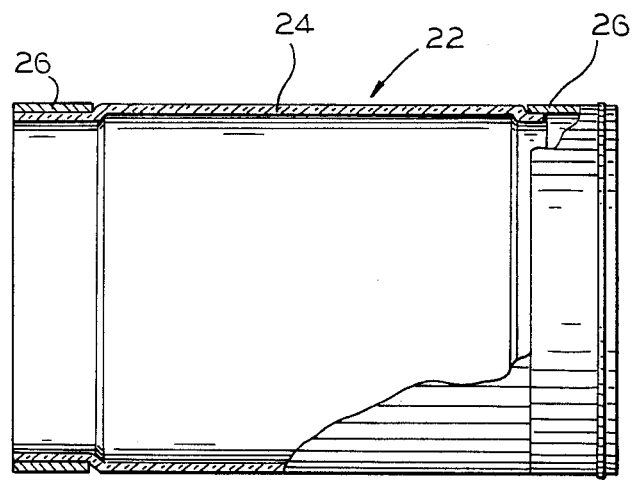
FIG. 2 is a front elevational view, partially in section, illustrating a composite shielding member for use in the dynamoelectric machine of FIG. 1.

By referring to both FIG. 1 and FIG. 2, it will be seen that a composite shielding member 22 is disposed within the housing 20 between the stator 12 and the rotor 18. The composite shielding member 22 is formed of a non-conductive non-magnetic material at least in the region defined by the core 14 of the stator 12 and extending beyond the core 14 at both ends thereof at least into the region defined by the winding 16 of the stator 12. More specifically, the non-conductive material of the composite shielding member 22 comprises a non-porous ceramic material as at 24 facing the rotor 18 to prevent fluid migration therethrough.

As will also be seen, the composite shielding member 22 is formed to have end portions 26 of a second material which is integral with the non-conductive ceramic material as at 24. The end portions 26 are adapted for securing the composite shielding member 22 in a fixed position within the housing 20 in a manner establishing a seal therebetween to define a sealed rotor cavity 28 adapted to receive a fluid therewithin, i.e., the rotor cavity 28 is sealed such that the fluid in the rotor cavity is shielded from exposure to the core 14 of the stator 12. As a result, the core 14 of the stator 12 is isolated from the fluid in the rotor cavity 28 by the composite shielding member 22.

Referring specifically to FIG. 1, the dynamoelectric machine 10 includes means for supplying the fluid to a heat source distant from the rotor 18. In particular, a main system pump 30 receives fluid from a source through an inlet 32 and delivers it to a heat source external to the alternator and then back to a turbine 34 although some of the fluid will leak into the rotor cavity 28 through the pump seals and the turbine seals on the high pressure side of the pump 30 and the turbine 34, respectively. With this arrangement, the pump 30 delivers the fluid, initially, in liquid form into a pump cavity 36 and, then, the liquid exits the pump 30 through rotating pivots and an outlet 38.

In a practical embodiment of the dynamoelectric machine 10, the core 14 of the stator 12 is laminated and disposed centrally of the winding 16. In order to protect the laminations of the core 14, the ceramic material of the composite shielding member 22 extends beyond the laminations of the core 14.

As shown in FIG. 2, the non-conductive ceramic material as at 24 is disposed intermediate the end portions 26 of the composite shielding member 22 which are formed of the second material. Preferably, the end portions are formed of a metallic material which is integral with the non-conductive ceramic material 24. By utilizing the metallic end portions 26, it is possible for the composite shielding member 22 to be firmly secured to the housing 20 by welding or brazing or by clamping between adjacent housing portions such as 20a and 20b.

Since the operating fluid is in gaseous form in the rotor cavity 28, the composite shielding member 22 must be capable of preventing outgassing therethrough. This is important to protect the laminations of the core 14 of the stator 12 and for the overall efficient operation of the dynamoelectric machine 10. It is equally important to prevent contamination of the working fluid by outgassing from the stator organic components (epoxy, varnish, insulation, etc.) which could otherwise migrate into the toluene in the rotor cavity 28 causing the toluene to degrade. This would be highly detrimental because of the significant reduction in the thermodynamic properties of the toluene that would be experienced. With the non-conductive ceramic material as at 24 facing the rotor 18, the composite shielding member 22 is well suited for preventing fluid outgassing therethrough.

Figure 3:
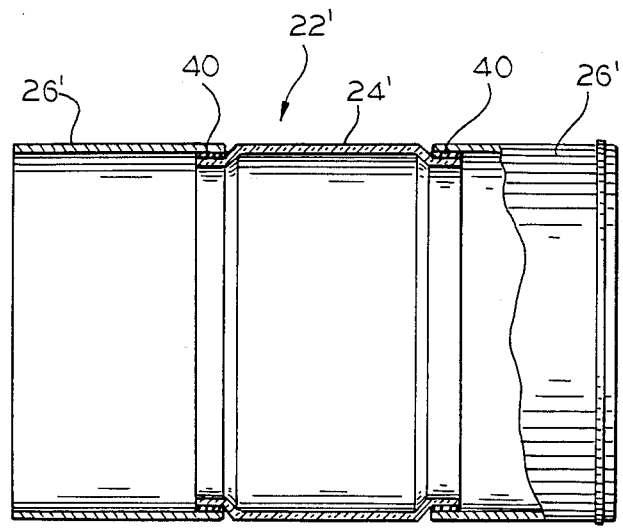
FIG. 3 is a front elevational view, partially in section, illustrating an alternative embodiment of composite shielding member for use in the dynamoelectric machine of FIG. 1.

Also, by joining the metallic end portions 26 between the housing portions 20a and 20b by clamping or welding or brazing, the composite shielding member can be secured in a fixed position within the housing 20 to ensure the stator shielding function of the composite shielding member 22. For this purpose, the metallic end portions 26 can be formed on the non-conductive ceramic material 24 by vapor deposition, or metallic end portions 26' (see FIG. 3) can be pre-formed and secured to the non-conductive ceramic material 24' by flame attachment, or metallic end portions 26' can be pre-formed and secured to the non-conductive ceramic material 24' by vapor deposition, i.e., a vapor deposition ring can be formed as at 40 at each of the opposing ends of the non-conductive ceramic material 24' to which the pre-formed metallic end portions 26' can be attached (again see FIG. 3). In addition, while the non-conductive ceramic material 24 is shown substantially coextensive with the entire length of the composite shielding member 22 in FIG. 2, FIG. 3 illustrates an alternative embodiment of composite shielding member 22' which utilizes non-conductive ceramic material 24' that extends only slightly beyond the laminated core 14 at both ends thereof.

In the preferred embodiment, the fluid is an organic liquid having solvent characteristics such as toluene, Freon, ammonia, or the like. As previously mentioned, the organic liquid is in a gaseous state in the rotor cavity 28 which occurs by reason of the vaporization temperature and pressure of the liquid and the operating temperature and pressure of the dynamoelectric machine 10 in the region of the rotor cavity 28, and the rotor 18 is driven by the turbine 34 which is driven by the organic liquid in the gaseous state. As will be described hereinafter, the organic liquid is alternately vaporized and condensed in a continuous closed cycle system external to the dynamoelectric machine 10.

Figure 4:
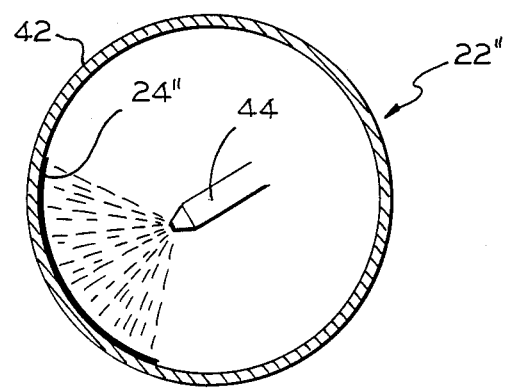
FIG. 4 is an end elevational view, partially in section, illustrating a method of forming a composite shielding member for use in the dynamoelectric machine of FIG. 1.

Referring to FIG. 4, still another embodiment of composite shielding member 22" is shown being formed. In this embodiment, the composite shielding member 22" is formed of a non-conductive base material 42 which is directly secured to the stator 12 in a fixed position within the housing 20. This, of course, defines the rotor cavity 28 in exactly the same fashion as the previously described composite shielding members 22 and 22', all of which are adapted to receive a fluid therewithin. Further, the composite shielding member 22" is also formed of a non-conductive ceramic material as at 24" directly secured to the non-conductive base material 42.

Preferably, the non-conductive base material 42 of the composite shielding member 22" is an epoxy-based material directly secured to the stator 12. Suitable examples of the epoxy-based material include a glass-epoxy mixture and a carbon-epoxy mixture. In any event, the non-conductive ceramic material 24" faces the rotor cavity 28 to prevent fluid outgassing therethrough.

As suggested hereinabove, the non-conductive base material 42 can be directly secured to the stator 12 prior to assembly within the housing 20. By so doing, the non-conductive ceramic material 24" can then also be applied prior to assembly by means such as plasma spraying as at 44 so as to be directly secured to the epoxy-based material comprising the non-conductive base material 42. In this manner, the resulting composite shielding member 22" is integral with the stator 12 to protect it from the operating fluid.

In the embodiments illustrated in FIGS. 2 and 3, the composite shielding members 22 and 22' are both comprised of hollow non-conductive ceramic material as at 24 and 24' intermediate the hollow metallic end portions 26 and 26', respectively. The composite shielding members 22 and 22', which may suitably be elongated and cylindrical in shape, are both adapted to be positioned within the housing 20 between the stator 12 and the rotor 18 such that the hollow non-conductive ceramic portions 24 and 24' are positioned at least in the region defined by the core 14 of the stator 12 so as to extend beyond the core 14 at both ends thereof at least into the region defined by the winding 16 of the stator 12, even in the embodiment utilizing a shortened non-conductive ceramic portion 24' with elongated metallic end portions 26'. Also, in both embodiments, the metallic end portions 26 and 26' are adapted to be secured by welding or by clamping between the housing portions 20a and 20b for securing the composite shielding members 22 and 22' in a fixed position within the housing 20.

In forming the composite shielding members 22 and 22', a unique method in accordance with the invention may be utilized. The method includes the step of providing a hollow non-conductive ceramic portion such as 24 and 24' of a length adapted to be positioned within the housing 20 between the stator 12 and the rotor 18 so as to be positioned at least in the region defined by the core 14 of the stator 12 and to extend beyond the core 14 at both ends thereof at least into the region defined by the winding 16 of the stator 12. The method also includes the step of forming the hollow metallic end portions 26 and 26' integrally with the hollow non-conductive ceramic portions 24 and 24' and of a length adapted for securing the composite shielding members 22 and 22' in a fixed position within the housing 20 to define the rotor cavity 28 adapted to receive the fluid with the hollow non-conductive ceramic portion such as 24 and 24' facing the rotor cavity 28 to prevent fluid outgassing therethrough. After these steps have been followed, the method also includes the step of securing the composite shielding member 22 and 22' within the housing 20 by securing the hollow metallic end portions 26 and 26' to the housing 20.

Additionally, the method contemplates the metallic end portions 26 and 26' being formed on the non-conductive ceramic material 24 and 24' by vapor deposition. Alternatively, the metallic end portions 26 and 26' are either pre-formed and secured to the non-conductive ceramic material by flame attachment or by vapor deposition. Moreover, the method contemplates the hollow metallic end portions 26 and 26' being secured to the housing 20 by either welding or brazing or clamping.

With regard to the embodiment illustrated in FIG. 4, another unique method of providing a composite shielding member 22" is followed. The method includes the step of providing a non-conductive base material 42. The non-conductive base material 42 is then secured directly to the stator 12 in a fixed position within the housing 20 to define the rotor cavity 28 adapted to receive the fluid within the dynamoelectric machine 10. The method also includes the step of providing the non-conductive ceramic material 24". The non-conductive ceramic material 24" is then secured directly to the non-conductive base material 42 so as to render the non-conductive ceramic material 24" integral with the non-conductive base material 42. Moreover, the non-conductive ceramic material 24" is secured to the non-conductive base material 42 so as to face the rotor cavity 28 to prevent fluid outgassing therethrough.

With regard to the method of forming the composite shielding member 22", the non-conductive base material 42 is preferably an epoxy-based material such as a glass-epoxy mixture or a carbon-epoxy mixture which is directly secured to the stator 12 before assembly into the housing 20. The method then contemplates the non-conductive ceramic material 24" being applied to the non-conductive base material 42 by means such as plasma spraying so as to be directly secured to the epoxy-based material comprising the non-conductive base material 42. In this manner, the resulting composite shielding member 22" is rendered integral with the stator 12 to prevent against contamination of the operating fluid.

In operation, the dynamoelectric machine transmits power to the main system pump 30 to deliver the operating fluid to an external vaporizer which converts the toluene from a liquid to a gas. This occurs because of the fact that the operating temperature of the external heat source is on the order of 600° to 750° F., which is above the vaporization point for organic corrosive reactive fluids or liquids such as toluene, Freon, ammonia and the like that will be utilized in dynamoelectric machines of the type under consideration. In the gaseous state, the operating fluid is delivered to an inlet plenum 46 where it proceeds to drive the turbine 34 before entering an expansion chamber 48.

At a later point, the gas is delivered to a condensing unit where it is condensed and converted back into a liquid. The liquid is, in turn, returned to the inlet 32 of the pump 30 where it is recirculated through the dynamoelectric machine 10 in a resumption of the closed cycle, i.e., the Rankine cycle which the system follows. Despite the recirculation of the operating fluid and the possible leakage into the rotor cavity 28 on the high pressure side of the pump 30 and the turbine 34, the composite shielding member serves to protect the fluid from contamination and also serves, along with the seals as at 50, 52 and 54, to retard leakage of the operating fluid, and even then the operating fluid stays in the system since the entire system is hermetic, i.e., welded, and the seals thus only isolate high pressure zones from low pressure cavities, where the rotary parts exist. This is particularly critical for applications such as the Space Station where the power supply must be maintained for a period of time on the order of 10 to 30 years without maintenance. Since the operating fluid cannot reach the laminations of the stator, the possibility that the insulating materials will be softened and degraded and the operating fluid will be contaminated is eliminated.

By reason of the isolation of the laminations of the core of the stator, there can be no contamination of the operating fluid. This isolation also serves to ensure a closed cycle system in which there is no leakage or loss of the operating fluid despite the phase changes of the fluid during operation, i.e., the operating fluid that reaches the rotor cavity 28 is uncontaminated and can be safely returned to the system. Moreover, because of the sealed nature of the dynamoelectric machine, there is no possibility of external contamination or damage caused by the operating fluid.

By utilizing a ceramic material in the manner indicated, it is possible to prevent migration of the operating fluid from the rotor cavity as previously discussed. This not only prevents degradation of insulating materials associated with the laminations of the core of the stator but also prevents softening and degradation of epoxies used in potting since resinous material is known to degrade in the presence of organic solvents such as toluene, Freon, ammonia and the like. Further, the ceramic material prevents stator outgassing products from contaminating the operating fluid and thus prevents any increase in non-condensible gas formation in the closed cycle system.

As will be appreciated, the metallic end portions may suitably be brazed or welded to the housing. The principal criteria for the length of the ceramic material portion of the composite shielding member is that the ceramic material must exist in the electromagnetic flux path area such as 56, i.e., where the rotor pole pieces interface magnetically with the lamination of the core of the stator. In this connection, the rotor pole pieces are typically disposed at opposite ends such as 58 and 60 of the housing of the dynamoelectric machine (see FIG. 1).

Finally, with regard to the embodiment as illustrated in FIG. 4, the non-conductive ceramic material may be applied in a different manner than plasma spraying. For instance, it can also be applied by detonation or ion-implantation techniques directly to the interior of the preassembled stator. Regardless of the technique, the non-conductive ceramic material is secured to the non-conductive base material so as to face the rotor cavity.

While in the foregoing specification there have been set forth preferred embodiments of the invention, it will be appreciated that the details herein given may be varied by those skilled in the art without departing from the spirit and scope of the invention as defined by the appended claims.

We claim:

1. A dynamoelectric machine, comprising:
   a stator including a core having a winding applied thereto;
   a rotor disposed inwardly of said stator in spaced relation to said core and said winding;
   means for delivering a corrosive reactive fluid to a turbine; and
   a composite shielding member disposed within said housing between said stator and said rotor, said composite shielding member being formed of a non-conductive non-magnetic material at least in the region defined by said core of said stator and extending beyond said core at both ends thereof at least into the region defined by said winding of said stator, said non-conductive non-magnetic material including a non-porous ceramic material facing said rotor to prevent said fluid from migrating therethrough;
   said composite shielding member also being formed of a second material integral with said non-conductive ceramic material, said second material being adapted for securing said composite shielding member in a fixed position within said housing in a sealed manner to define a sealed rotor cavity capable of receiving said fluid therewithin, said core of said stator being isolated from said fluid in said rotor cavity by said composite shielding member.

2. The dynamoelectric machine as defined by claim 1 wherein said core of said stator is laminated and is disposed centrally of said winding.

3. The dynamoelectric machine as defined by claim 1 wherein said non-conductive non-magnetic ceramic material is disposed intermediate the end portions of said composite shielding member, said end portions being formed of a metallic material, said metallic material comprising said second material integral with said non-conductive non-magnetic ceramic material.

4. The dynamoelectric machine as defined by claim 3 wherein said metallic end portions of said composite shielding member are adapted to be secured to said housing in a sealed manner.

5. The dynamoelectric machine as defined by claim 1 wherein said second material of said composite shielding member is a non-conductive base material, said non-conductive base material being secured directly to said stator, said non-conductive ceramic material being secured directly to said non-conductive base material.

6. A dynamoelectric machine, comprising:
   a stator including a core having a winding applied thereto;
   a rotor disposed inwardly of said stator in spaced relation to said core and said winding;
   said stator and said rotor being mounted in a housing;
   means for delivering a corrosive reactive fluid to a turbine; and
   a composite shielding member disposed within said housing between said stator and said rotor, said composite shielding member being formed of a non-conductive non-magnetic non-porous ceramic material at least in the region defined by said core of said stator and extending beyond said core at both ends thereof at least into the region defined by said winding of said stator, said ceramic material facing said rotor to prevent said fluid from outgassing therethrough;
   said composite shielding member also including metallic end portions integral with said ceramic material, said metallic end portions being adapted for securing said composite shielding member in a fixed position within said housing in a sealed manner to define a sealed rotor cavity capable of receiving said fluid therewithin, said core of said stator being isolated from said fluid in said rotor cavity by said composite shielding member.

7. The dynamoelectric machine as defined by claim 6 wherein said metallic end portions of said composite shielding member are formed on said non-conductive non-magnetic ceramic material by vapor deposition.

8. The dynamoelectric machine as defined by claim 6 wherein said metallic end portions of said composite shielding member are pre-formed and secured to said non-conductive non-magnetic ceramic material by thermal attachment.

9. The dynamoelectric machine as defined by claim 6 wherein said metallic end portions of said composite shielding member are pre-formed and secured to said non-conductive non-magnetic ceramic material by vapor deposition.

10. The dynamoelectric machine as defined by claim 6 wherein said fluid is a liquid with solvent characteristics.

11. The dynamoelectric machine as defined by claim 10 wherein said liquid is in a gaseous state in said rotor cavity.

12. The dynamoelectric machine as defined by claim 11 wherein said turbine is driven by said liquid in said gaseous state.

13. The dynamoelectric machine as defined by claim 10 wherein said liquid is alternately vaporized and condensed in a continuous closed cycle system.

14. A dynamoelectric machine, comprising:
    a stator comprising a core having a winding applied thereto;
    a rotor disposed inwardly of said stator in spaced relation to said core and said winding;
    said stator and said rotor being mounted in a housing;
    means for delivering a corrosive reactive fluid to a turbine; and
    a composite shielding member disposed within said housing between said stator and said rotor, said composite shielding member being formed of a non-conductive base material directly secured to said stator in a fixed position within said housing to define a sealed rotor cavity, said composite shielding member also being formed of a non-conductive non-magnetic non-porous ceramic material directly secured to said non-conductive base material;
    said rotor cavity defined by said non-conductive base material being capable of receiving said fluid therewithin, said ceramic material facing said rotor cavity to prevent said fluid from outgassing therethrough, said core of said stator being isolated from said fluid in said rotor cavity by said composite shielding member.

15. The dynamoelectric machine as defined by claim 14 wherein said non-conductive base material of said composite shielding member is an epoxy-based material directly secured to said stator.

16. The dynamoelectric machine as defined by claim 15 wherein said epoxy-based material is a glass-epoxy mixture.

17. The dynamoelectric machine as defined by claim 15 wherein said epoxy-based material is a carbon-epoxy mixture.

18. The dynamoelectric machine as defined by claim 15 wherein said ceramic material of said composite shielding member is applied by plasma spraying so as to be directly secured to said epoxy-based material.

19. The dynamoelectric machine as defined by claim 14 wherein said fluid is a liquid with solvent characteristics.

20. The dynamoelectric machine as defined by claim 19 wherein said liquid is in a gaseous state in said rotor cavity.

21. The dynamoelectric machine as defined by claim 20 wherein said turbine is driven by said liquid in said gaseous state.

22. The dynamoelectric machine as defined by claim 19 wherein said liquid is alternately vaporized and condensed in a continuous closed cycle system.

23. A composite shielding member for a dynamoelectric machine, comprising:

a hollow non-conductive non-magnetic non-porous ceramic portion and hollow metallic end portions integral with said hollow ceramic portion, said composite shielding member being adapted to be positioned within a housing between a stator and a rotor such that said hollow ceramic portion is positioned at least in the region defined by a core of said stator and extends beyond said core at both ends thereof at least into the region defined by a winding of said stator and said hollow metallic end portions being adapted for securing said composite shielding member in a fixed position within said housing in a sealed manner to define a sealed rotor cavity adapted to receive a corrosive or reactive fluid therewithin, said hollow metallic end portions being adapted to secure said composite shielding member such that said hollow ceramic portion faces said rotor cavity to prevent said fluid from outgassing therethrough.

24. The composite shielding member as defined by claim 23 wherein said metallic end portions are formed on said ceramic material by vapor deposition.

25. The composite shielding member as defined by claim 23 wherein said metallic end portions are preformed and secured to said ceramic material by thermal attachment.

26. The composite shielding member as defined by claim 23 wherein said metallic end portions are preformed and secured to said ceramic material by vapor deposition.

* * * * *